US012186765B2

(12) United States Patent
Windt et al.

(10) Patent No.: US 12,186,765 B2
(45) Date of Patent: Jan. 7, 2025

(54) DEVICE FOR PROVIDING MIST TO A SURROUNDING ENVIRONMENT

(71) Applicant: Danfoss Fire Safety A/S, Odense (DK)

(72) Inventors: Carsten Windt, Odense (DK); Lars Wrang Jensen, Rude (DK); Henrik Bygbjerg, Kirke Hyllinge (DK)

(73) Assignee: DANFOSS FIRE SAFETY A/S, Odense (DK)

(*) Notice: Subject to any disclaimer, the term of this patent is extended or adjusted under 35 U.S.C. 154(b) by 482 days.

(21) Appl. No.: 17/613,685

(22) PCT Filed: May 18, 2020

(86) PCT No.: PCT/EP2020/063816
§ 371 (c)(1),
(2) Date: Nov. 23, 2021

(87) PCT Pub. No.: WO2020/244913
PCT Pub. Date: Dec. 10, 2020

(65) Prior Publication Data

US 2022/0323975 A1 Oct. 13, 2022

(30) Foreign Application Priority Data

Jun. 6, 2019 (DK) ............................ PA201900689

(51) Int. Cl.
*B05B 1/26* (2006.01)
*B05B 1/30* (2006.01)
*B05B 12/08* (2006.01)

(52) U.S. Cl.
CPC ................ *B05B 1/26* (2013.01); *B05B 1/304* (2013.01); *B05B 12/087* (2013.01)

(58) Field of Classification Search
CPC ......... B05B 1/26; B05B 1/304; B05B 12/087; B05B 1/1609; B05B 1/02; B05B 1/262;
(Continued)

(56) References Cited

U.S. PATENT DOCUMENTS 2,389,331 A 11/1945 Tyden
2,568,429 A * 9/1951 Burnam .............. A62C 35/605
239/452

(Continued)

FOREIGN PATENT DOCUMENTS

CN 1747793 A 3/2006
CN 104271251 A 1/2015

(Continued)

OTHER PUBLICATIONS

International Search Report for PCT/EP2020/063816 Dated Jun. 29, 2020.

*Primary Examiner* — Christopher R Dandridge
(74) *Attorney, Agent, or Firm* — McCormick, Paulding & Huber PLLC

(57) ABSTRACT

The invention relates to a device (10) for providing mist to a surrounding environment, the device (10) comprising a housing unit (12) having an inlet opening (18), an outlet opening (20), and a chamber (22) extending between the inlet opening (18) and the outlet opening (20) along a central axis (24); a nozzle unit (14) including at least one orifice (26); wherein the nozzle unit (14) is arranged in the chamber (22), the nozzle unit (14) being slidable along the central axis (24) between a closing position, in which the nozzle unit (14) closes the outlet opening (20), and an opening position, in which the at least one orifice (26) connects the chamber (22) to the surrounding environment in fluid communication; wherein the nozzle unit (14) transfers from the closing position to the opening position if a fluid pressure at the inlet opening (18) exceeds a predefined threshold; wherein the nozzle unit (14) comprises a deflector part (28) for deflecting fluid in the opening position and for closing the outlet opening (20) in the closing position, wherein the at least one orifice (26) is arranged offset to the central axis (24) between the inlet opening (18) and the deflector part
(Continued)

(28); wherein the at least one orifice (26) is configured to guide fluid flowing through the at least one orifice (26) and to lead the fluid towards the deflector part (28). The invention provides an improved device (10) for providing mist to a surrounding environment, which reduces the required amount of fluid and increases the efficiency of the fluid distribution.

20 Claims, 4 Drawing Sheets

(58) Field of Classification Search
CPC ......... B05B 1/308; B05B 1/12; B05B 1/3073; F02M 2547/00; F02M 63/0005; F02M 47/00; F02M 47/02; F02M 47/025; F02M 47/046
See application file for complete search history.

(56) References Cited

U.S. PATENT DOCUMENTS

| | | | | |
|---|---|---|---|---|
| 3,684,192 A * | 8/1972 | McMillan | A62C 31/02 239/452 |
| 2003/0160110 A1* | 8/2003 | Boecking | F02M 47/06 239/96 |
| 2010/0132963 A1* | 6/2010 | Sprakel | A62C 35/023 169/46 |

FOREIGN PATENT DOCUMENTS

| | | | |
|---|---|---|---|
| CN | 105855079 | A | 8/2016 |
| DE | 202016003551 | U1 | 7/2016 |
| EP | 1170059 | A2 | 1/2002 |
| EP | 1537918 | A1 | 6/2005 |
| WO | 8200603 | A1 | 3/1982 |
| WO | 2007060557 | A1 | 5/2007 |

* cited by examiner

DEVICE FOR PROVIDING MIST TO A SURROUNDING ENVIRONMENT

CROSS-REFERENCE TO RELATED APPLICATION

This application is a National Stage application of International Patent Application No. PCT/EP2020/063816, filed on May 18, 2020, which claims priority to Danish Application No. PA201900689 filed on Jun. 6, 2019, each of which is hereby incorporated by reference in its entirety.

TECHNICAL FIELD

The invention relates to a device for providing mist to a surrounding environment, the device comprising a housing unit having an inlet opening, an outlet opening, and a chamber extending between the inlet opening and the outlet opening along a central axis; a nozzle unit comprising at least one orifice; wherein the nozzle unit is arranged in the chamber, the nozzle unit being slidable along the central axis between a closing position, in which the nozzle unit closes the opening, and an opening position, in which the at least one orifice is arranged in the opening and connects the chamber to the surrounding environment in fluid communication; wherein the nozzle unit transfers from the closing position to the opening position if a fluid pressure at the inlet opening exceeds a predefined threshold.

BACKGROUND

Nozzles are used to provide fluid within an area where the fluid is desired, e.g. for firefighting. Nozzles may be used to spray the fluid within that area. The fluid is delivered by pressing the fluidic material through openings in the nozzle such that the fluid is distributed to the environment surrounding the nozzle.

Nozzles may comprise an inner nozzle part and the outer nozzle part, wherein in a passive state the inner nozzle part is retracted in the outer nozzle part. In an active state, the inner nozzle pops out of the outer nozzle part such that the openings, which provide the fluid are arranged outside of the outer nozzle part. By pressing the fluid through the openings of the fluid is sprayed on the desired area. From U.S. Pat. No. 2,389,331 A it is known to activate the nozzle by destroying a locking element, which holds the inner nozzle part in the retracted position in the outer nozzle part. In another example, according to WO 2007/060557 A1 it is known that the fluid pressure in the nozzle pushes the inner nozzle part out of the outer nozzle part. There is an ongoing demand for more and more effective nozzles.

SUMMARY

Thus, the technical object may be providing an improved device for providing mist to a surrounding environment, which reduces the required amount of fluid and increases the efficiency of the fluid distribution.

Claims 1 and 15 indicate the main features of the invention. Features of embodiments of the invention are subject of claims 2 to 14.

In an aspect of the invention, a device for providing mist to a surrounding environment is provided, the device comprising a housing unit having an inlet opening, an outlet opening, and a chamber extending between the inlet opening and the outlet opening along a central axis; a nozzle unit comprising at least one orifice; wherein the nozzle unit is arranged in the chamber, the nozzle unit being slidable along the central axis between a closing position, in which the nozzle unit closes the outlet opening, and an opening position, in which the at least one orifice connects the chamber to the surrounding environment in fluid communication; wherein the nozzle unit transfers from the closing position to the opening position if a fluid pressure at the inlet opening exceeds a predefined threshold; wherein the nozzle unit comprises a deflector part for deflecting fluid in the opening position and for closing the outlet opening in the closing position, wherein the at least one orifice is arranged offset to the central axis between the inlet opening and the deflector part; wherein the at least one orifice is configured to guide fluid flowing through the at least one orifice and to lead the fluid towards the deflector part.

The invention provides a device for providing mist to the surrounding environment, which distributes the fluid by using the deflector part of the nozzle unit in the opening state. The inlet opening of the housing unit may be connected to a fluid source. Fluid may therefore stream through the inlet opening into the housing unit. The fluid flow increases the pressure in the housing unit if the nozzle unit is in the closing position, in which the nozzle unit closes the outlet opening of the housing unit. In the closing position, the at least one orifice of the nozzle unit is completely arranged inside the housing unit without any fluid communicating connection to the surrounding environment. This means that the orifice begins and ends in the housing unit. The nozzle unit is transferred to the opening state by increasing the pressure in the housing unit. In the opening state, the nozzle unit comprises at least one orifice, which connects the inlet opening and the surrounding environment through the outlet opening in fluid communication. This means, that the fluid may flow through the at least one orifice from the inlet opening to the surrounding environment. In the opening position, the at least one orifice may for example be arranged in the outlet opening. The at least one orifice transforms the fluid to fluid and leads the fluid towards the deflector part. The deflector part is arranged in the path of the fluid that the at least one orifice distributes. The deflector part deflects the fluid being provided from the at least one orifice when the fluid arrives at the deflector part. The deflection of the fluid may be such that the fluid is distributed to the relevant areas in the surrounding environment of the device. The offset arrangement of the at least one orifice with respect to the central axis increases the efficiency of the distribution of the fluid by the deflector part. This reduces the required amount of fluid and provides a concentrated spray pattern of the fluid. The fluid may be spray, mist and/or liquid. In the closing state, the deflector part is arranged in the outlet opening. Then, the deflector part closes the outlet opening. This protects the at least one orifice from dirt.

In an example, the device may further comprise a sealing unit, wherein, in the closing position, the sealing unit is arranged between the deflector part and the outlet opening and extending around the outlet opening. In a further example, the sealing unit particularly may be immovably arranged at the outlet opening.

The sealing unit protects the nozzle unit, in particular the orifices, from dirt, e.g. dust and/or oil. Furthermore, the sealing unit seals the region between the nozzle unit and the outlet opening such that the fluid does not leak out between the nozzle unit and the outlet opening.

In the closing position, the sealing unit may be frictionally engaged with the nozzle unit with a friction force that determines the predefined threshold.

The sealing unit therefore holds the nozzle unit in position if the nozzle unit is in the closed position. The nozzle unit does not move through the outlet opening if the pressure difference between the housing unit and the surrounding environment provides a force that is smaller than the friction force. When the pressure difference provides a force being bigger than the friction force, the nozzle unit moves through the outlet opening.

The device may further comprise a reset unit for driving the nozzle unit to the closing position.

Then, the default position of the nozzle unit is the closing position. The reset unit has to overcome at least the friction between the nozzle unit and the outlet opening, if a sealing unit is present. Furthermore, the reset unit may provide a force, which further is able to counter the weight of the nozzle unit if the central axis is aligned vertically.

The nozzle unit may further comprise a flange element for supporting the reset unit, the flange element extending around the central axis, wherein the reset unit is a spring that is arranged between the flange element and the outlet opening.

The flange element provides a support for the spring such that the spring, in a tensioned state, can provide a force to the nozzle unit along the central axis. The spring may be a coil spring that is arranged on an edge element extending around the outlet opening.

In an additional or alternative example, the device may comprise a trigger element, which induces the transition of the nozzle unit to the opening position. The trigger element may for example be a thermally sensitive component, for example an ampule that will break under given conditions or a melting material. The trigger element may be placed between the nozzle unit and the outlet opening and hold the nozzle in place. If the ampule breaks or the melting material melts, respectively, the nozzle unit automatically moves to the opening position.

The nozzle unit may further comprise a support element connecting the deflector part to the nozzle unit and extending along the central axis.

The support element connects the deflector part to the nozzle unit. In combination with the offset placement of the orifice, the support element connects the deflector part with a minimal disturbance of the fluid distribution in the opening position. A plurality of orifices may be arranged around the support element, wherein the deflector part is formed as a flange around the support element.

The housing unit may comprise a stop flange at the outlet opening, wherein the nozzle unit comprises a stop shoulder, wherein, in the closing position the stop shoulder is spaced away from the stop flange, and wherein, in the opening position, the stop shoulder contacts the stop flange stopping a movement of the nozzle unit towards the outlet opening.

The stop shoulder restricts the movement of the nozzle unit along the central axis through the outlet opening. This means that in the opening position, the nozzle unit is arranged such that the stop shoulder contacts the edge of the outlet opening which forms the stop flange. The outlet opening may therefore be smaller than the wall of the housing unit comprising the outlet opening. The stop shoulder has a bigger radius than the outlet opening. This provides a secure handling and functioning of the device without the risk that the nozzle unit falls out of the housing unit when transitioning to the opening position.

The deflector part may comprise a surface element for diffusing fluid coming from the at least one orifice, the surface element facing the at least one orifice.

In an example, the surface element may be arranged in a plane that is orthogonal to the central axis.

The fluid being deflected by the deflector part is then mainly reflected and distributed in every direction around the deflector part.

In another example, the surface element may be angled with respect to a plane, which is orthogonal to the central axis, wherein the surface element particularly leads the fluid away from the central axis.

The angle between the plane, which is orthogonal to the central axis, and the surface element may be in the range between 0° to 90°, particularly 0° to 45°, further particularly 0° to 20°, most particularly 10°.

The deflector part then deflects the fluid in a main deflection direction pointing away from the deflector part. The angle of the main direction with respect to the central axis depends on the angle of the surface element. This improves the distribution of the fluid around the device.

The housing unit may comprise an exterior surface element at the outlet opening for collecting the deflected fluid coming from the deflector part, wherein the exterior surface element is angled with respect to a plane, which is orthogonal to the central axis, concentrating the fluid into a fluid area, which extends away from the housing unit along the central axis.

The exterior surface element on the housing unit collects the deflected fluid, which is provided by the deflector part. Furthermore, the exterior surface channels the collected fluid such that the fluid is led into the fluid area. This improves the distribution of the fluid below the device. The exterior surface element may comprise an angle with respect to the place, which is orthogonal to the central axis, in the range from 0° to 90°, particularly 0° to 45°, most particularly 30°.

The exterior surface element may be arranged on a housing end part, which is detachable from the housing unit.

The detachable housing end part may be detached from the housing unit to attach another detachable housing end part to the housing unit. This allows changing the end part of the housing unit. Particularly, the shape of the end part of the housing may be changed and adapted to the use of the device. For example, for a focused spread of the fluid, a detachable housing end part may be attached having a shape that collects and channels the fluid into a focused fluid channel extending away from the device. For providing a wider spread of the fluid, the housing end part may comprise a shape that provides a less focused fluid channel.

The at least one orifice and the deflector part may be formed in a single material block providing the nozzle unit.

This provides a simple and cheap manufacturing of the nozzle unit.

The inlet opening may be connectable to a fluid supply, particularly to a top fluid supply, wherein the fluid particularly is water.

The housing unit may comprise a thread that is arranged at the inlet opening to provide a threaded connection to a connector of a fluid supply. The device may then easily be connected to the fluid supply.

The housing unit may further comprise a collar element extending around the outlet opening and away from the central axis.

If the device is mounted in a bore, the collar element may provide a stop when introducing the housing unit into the bore. Furthermore, a gap between the edge of the bore and the housing unit may be bridged by the collar element. The collar element then hides the bore and reduces the deposit or the fallout of dirt in the bore.

In another aspect, a system for providing mist to a surrounding environment is provided, the system comprising at least two fluid supply connectors and at least two devices according to the description mentioned above, wherein the at least two devices are connected to the at least two fluid supply connectors.

The effects and further embodiments of the system according to the present invention are analogous to the effects and embodiments of the device according to the description mentioned above. Thus, it is referred to the above description of the device.

BRIEF DESCRIPTION OF THE DRAWINGS

Further features, details and advantages of the invention result from the wording of the claims as well as from the following description of exemplary embodiments based on the drawings. The figures show:

DETAILED DESCRIPTION

Figure 1:
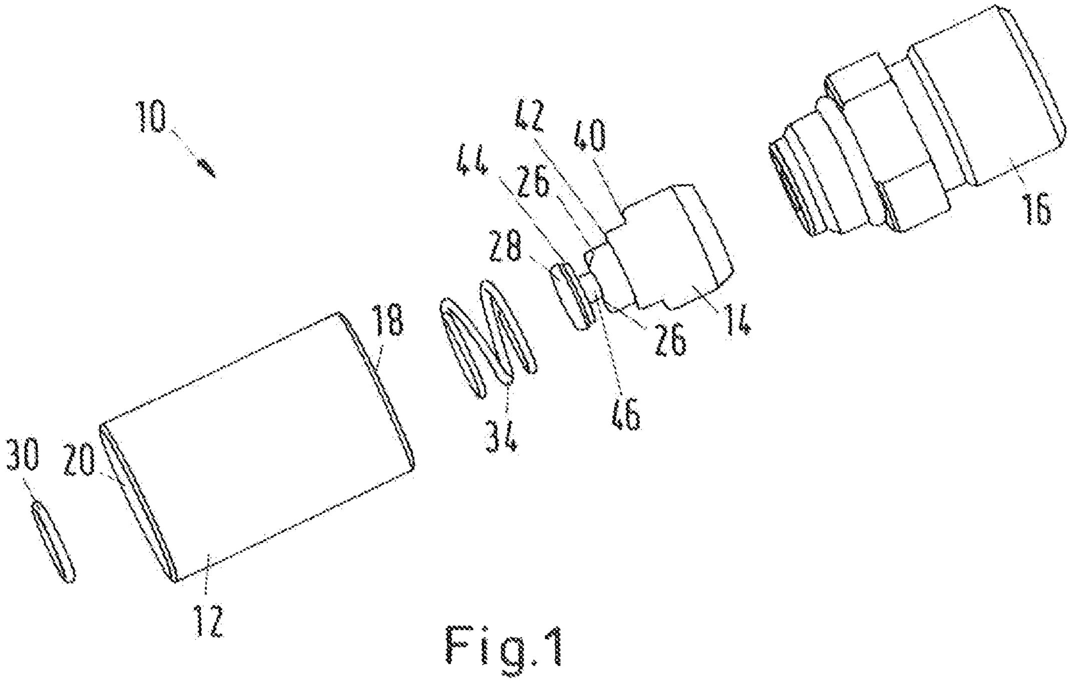
FIG. 1 a schematic drawing of the device for providing mist to a surrounding environment.

The following description uses the reference sign 10 for the entirety of the device for providing mist to a surrounding environment as shown in FIG. 1.

FIG. 1 shows an exploded view of the device 10. The device 10 comprises a housing unit 12, a nozzle unit 14, a sealing unit 30, and a reset unit 34. The reset unit 34 may be a coil spring. The housing unit 12 comprises an inlet opening 18, which is connectable to a fluid supply connector 16. The fluid supply connector 16 provides fluid to the device 10. The fluid flows through the inlet opening 18 into the housing unit 12.

Furthermore, the housing unit 12 comprises a chamber and an outlet opening 20, wherein the chamber extends from the inlet opening 18 to the outlet opening 20. The nozzle unit 14, the sealing unit 30, and the reset unit 34 are arranged in the chamber of the housing unit 12. The reset unit 34 and the nozzle unit 14 are in contact with the fluid that is provided by the fluid supply connector 16. The nozzle unit 14 is slidably arranged in the chamber. The nozzle unit 14 can slide between a closing position and an opening position.

Figure 2:
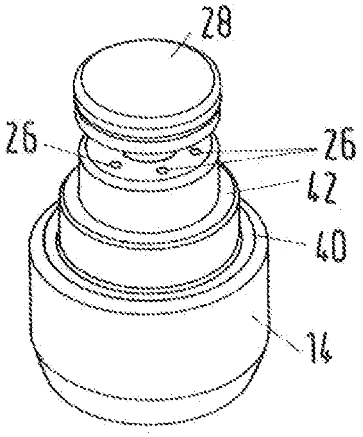
FIG. 2 a schematic drawing of the nozzle unit.

The nozzle unit 14 is shown in further detail in FIG. 2. The nozzle unit 12 comprises a deflector part 28 and a support element 46, which connects the deflector part 28 to the nozzle unit 14. Furthermore, the nozzle unit 14 comprises at least one orifice 26, which is configured to generate fluid from the fluid flowing through the at least one orifice 26. The at least one orifice 26 leads the fluid towards the deflector part 28 such that the fluid is deflected by the deflector part 28. For example, the nozzle unit 14 may comprise three orifices 26. However, the nozzle unit 14 may comprise any number of orifices 26, e.g. six, eight or ten etc. in the disclosed embodiment the nozzle unit 14 comprises six orifices distributed uniformed, but only three orifices are visible at FIG. 2. The higher the number of orifices 26, the better the fluid distribution around the nozzle unit 14.

A flange element 40 supports one end of the coil spring. The other end of the coil spring is supported in the housing unit at the outlet opening 20.

Furthermore, the nozzle unit 14 comprises a stop shoulder 42, which extends around the nozzle unit 14. The stop shoulder 42 comprises a diameter, which is bigger than the diameter of the outlet opening. The stop shoulder 42 stops a sliding movement of the nozzle unit 14 in the housing unit such that the nozzle unit 14 does not completely move through the outlet opening. In the opening position, the stop shoulder 42 may be operatively coupled with a stop flange extending around the outlet opening in the housing unit.

The nozzle unit 14 and the elements of the nozzle unit 14 may be manufactured from a single piece. This means, the nozzle unit 14 is made from one piece.

Figure 3A:
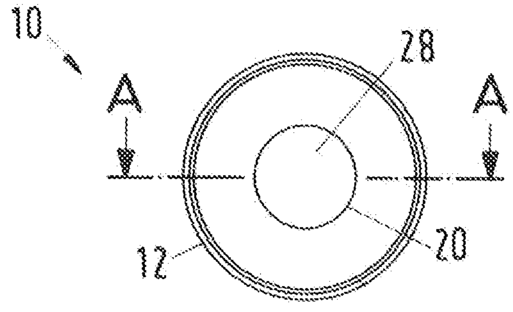
FIG. 3*a-c* a schematic drawing of the device in the closing position and the opening position.
Figure 3B:
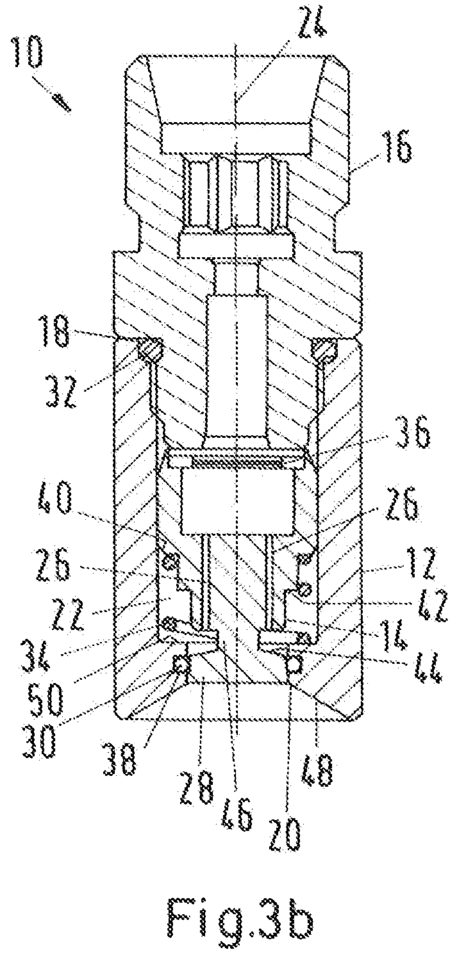
Figure 3C:
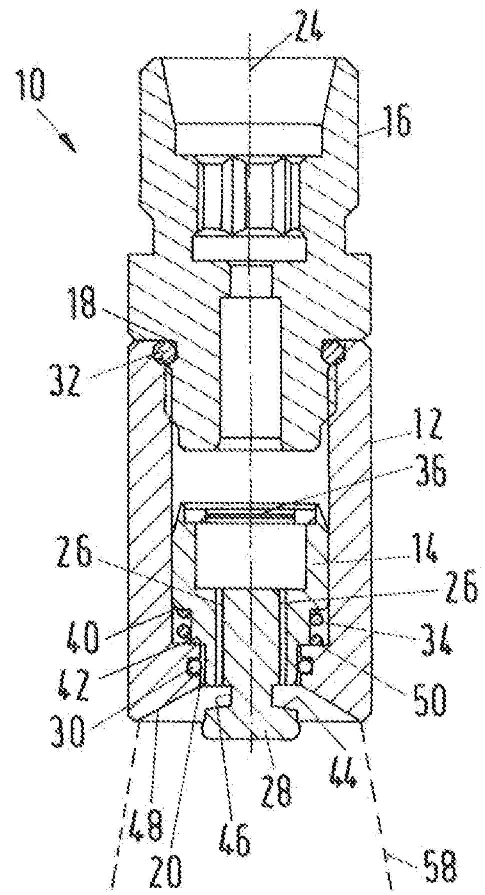

The device 10 is shown in further detail in FIGS. 3*a* to 3*c*. FIG. 3*a* shows a view on the outlet opening 20 of the housing unit 12. The deflector part 28 of the nozzle unit 14 is arranged in the outlet opening 20. FIGS. 3*b* and 3*c* show sectional views along the line A-A of FIG. 3*a*.

FIG. 3*b* shows the device 10 extending along a central axis 24, wherein the nozzle unit 14 is arranged in the chamber 22 in the closing position. In the closing position, the deflector part 28 of the nozzle unit 14 is arranged in the outlet opening 20 and closes the outlet opening 20. The sealing unit 30 is arranged in a cut 38 that extends around the outlet opening 20. The sealing unit 30 seals the space between the deflector part 28 and the edge of the outlet opening 20. Furthermore, the sealing unit 30 provides a friction force on the deflector part 28, which holds the deflector part 28 and the nozzle unit 14 in position. The friction force may define a predetermined threshold for a force that pushes the nozzle unit 14 along the central axis 24.

The reset unit 34 is arranged between the outlet opening 20 and the flange element 40 of the nozzle unit 14. The reset unit 34 provides a force, which drives the nozzle unit 14 towards the inlet opening 18. The force of the reset unit 34 is bigger than the predetermined threshold. Hence, the reset unit 34 may always be able to move the nozzle unit 14 along the central axis 24 in the chamber 22.

The at least one orifice 26 extends at the nozzle unit 14 within the chamber 22. This means, the at least one orifice 26 begins and ends in the chamber 22. Furthermore, the at least one orifice 26 may extend parallel to the central axis 24. The at least one orifice 26 is further arranged offset to the central axis 24. This means, that the at least one orifice 26 is off-axis with respect to the central axis 24.

The nozzle unit 14 further comprises an optional filter element 36, which is arranged between the inlet opening 18 and an end portion of the at least one orifice, which points towards the inlet opening 18. The filter element 36 filters particles from the fluid before the fluid flows into the at least one orifice26. This reduces the probability of a blocking of the at least one orifice 26.

The housing unit 12 comprises a thread element at the inlet opening 18 for connecting the inlet opening 18 to the fluid supply connector 16. A further sealing element 32 may seal any gap between the housing unit 12 and the fluid supply connector 16.

When fluid streams from the fluid supply connector 16 into the chamber 22, the pressure in the chamber 22 increases. The pressure results in a force, which pushes the nozzle unit 14 through the outlet opening 20. The nozzle unit 14 moves only if the force resulting from the pressure exceeds the predetermined threshold. For example, the force resulting from the pressure must overcome the friction force of the sealing unit 30 in combination with the force being provided by the reset unit 34.

The movement of the nozzle unit 14 through the outlet opening 20 transfers the nozzle unit 14 to the opening position, which is shown in FIG. 3*c*. At the same time, the coil spring is tensioned. The nozzle unit 14 moves through the outlet opening 20 until the stop shoulder 42 of the nozzle unit 14 contacts the stop flange 50 at the outlet opening 20. That contact stops the movement of the nozzle unit 14 through the outlet opening 20.

In the opening position, the nozzle unit 14 extends through the outlet opening 20. The at least one orifice 26 also extends through the outlet opening 20. Furthermore, the at least one orifice 26 passes the sealing element 30, such that the at least one orifice 26 connects the chamber 22 to the surrounding environment in a fluid communicative manner. The fluid flowing into the chamber 22 can then flow through the at least one orifice 26 to the surrounding environment. The at least one orifice 26 transfers the fluid to fluid and leads the fluid on the deflector part 28, that is positioned in the flow path of the fluid.

The fluid flowing to the deflector part 28 is deflected by a surface element 44 on the deflector part 28. The surface element 44 is angled with respect to a plane, which is orthogonal to the central axis 24. The angle between the surface element 44 and the plane may be such that the fluid is deflected away from the support element 46. The surface element 44 therefore spreads the fluid arriving on the deflector part 28.

The surface element 44 may extend around the central axis 24 and the nozzle unit 14. Thus, the surface element 44 may have an annular shape.

The angle between the surface element 44 and the plane may for example be in the range between 0° to 90°, particularly 0° to 45°, further particularly 0° to 20°, most particularly 10°.

The fluid being deflected by the deflector part 28 may be collected by an exterior surface element 48 of the housing unit 12. The exterior surface element 48 is configured to lead the fluid into a fluid area 58, which covers the region, in which the fluid shall be provided. This focuses the fluid in the fluid area 58. The fluid being provided by the at least one orifice 26 is therefore first spread by the deflector part 28 and then collected by the exterior surface element 48. The exterior surface element 48 may comprise a further angle with respect to a plane, which is orthogonal to the central axis 24.

The further angle may e.g. be in the range from 0° to 90°, particularly 0° to 45°, most particularly 30°.

The exterior surface element 48 may extend around the central axis 24 and the outlet opening 20. Thus, the exterior surface element 48 may have an annular shape.

When the fluid supply connector 16 ceases to supply fluid, the pressure in the chamber 22 reduces. Consequently, the force that pushes the nozzle unit 14 out of the outlet opening reduces. When that force becomes smaller than the force being provided by the reset unit 34, the nozzle unit 14 moves towards the inlet opening 18. That movement places the deflector part 28 in the outlet opening 20 such that the outlet opening 20 is closed. The nozzle unit 14 then returns to the closing position as shown in FIG. 3*b*.

In an additional or alternative example, the device may comprise a trigger element (not shown), which induces the transition of the nozzle unit to the opening position. The trigger element may for example be a thermally sensitive component, for example an ampule that will break under given conditions or a melting material. The trigger element may be placed between the nozzle unit and the outlet opening and hold the nozzle in place. If the ampule breaks or the melting material melts, respectively, the nozzle unit automatically moves to the opening position.

Figure 4:
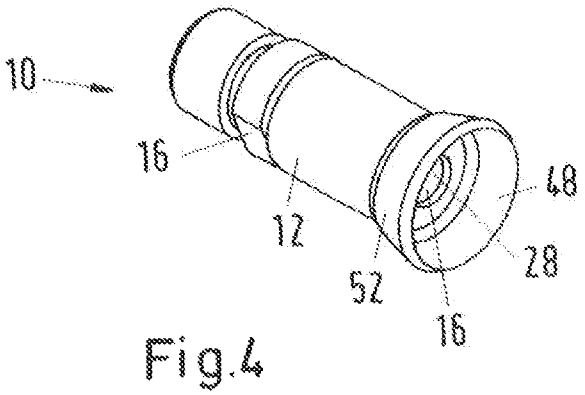
FIG. 4 a schematic drawing of the device with a detachable housing end part.

FIG. 4 shows a further exemplary embodiment of the device 10. The device 10 further comprises a detachable housing end part 52 at the housing unit 12. The housing end part 52 comprises the exterior surface element 48. The detachable housing end part 52 may be detached from the housing unit 12 to attach a further detachable housing end part 52 to the housing unit 12. The further detachable housing end part 52 comprises an exterior surface element 48 having another angle with respect to the plane being perpendicular to the central axis than the initial housing end part 52.

Figure 5:
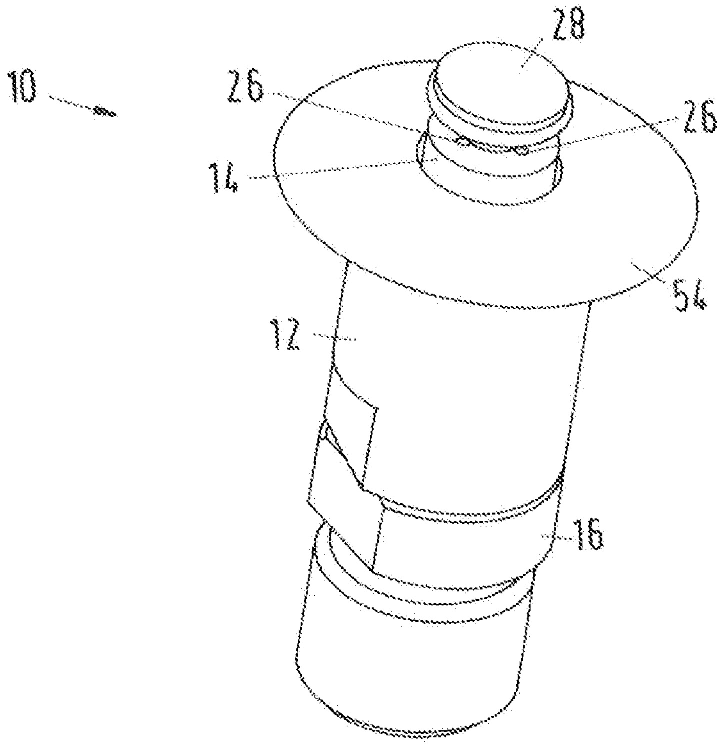
FIG. 5 a schematic drawing of the device with a collar element.

FIG. 5 shows a further exemplary embodiment of the device 10. The device 10 further comprises a collar element 54 at the housing unit. The collar element 54 extends away from the central axis. If the device 10 is mounted in a bore on a wall or further object, the collar element 54 may provide a stop when introducing the housing unit 12 into the bore. Furthermore, a gap between the edge of the bore and the housing unit 12 may be bridged by the collar element 54. Collar element 54 then hides the bore and reduces the deposit or the fallout of dirt in the bore.

Figure 6:
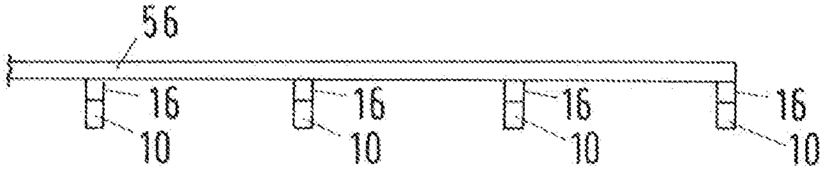
FIG. 6 a schematic drawing of the system for providing mist to a surrounding environment.

FIG. 6 shows a system 56 for providing fluid to a surrounding environment. The system 56 comprises a plurality of fluid supply connectors 16. Each fluid supply connector 16 comprises a threaded connector that is connectable to a housing unit of a device 10. Furthermore, the system 56 comprises a plurality of devices 10, which are connected to the fluid supply connectors 16. The system 56 may for example be mounted on a ceiling of a room as fire extinguishing system.

The invention is not limited to one of the aforementioned embodiments. It can be modified in many ways.

All features and advantages resulting from the claims, the description and the drawing, including constructive details, spatial arrangements and procedural steps, may be essential for the invention both in themselves and in various combinations.

What is claimed is:

1. A device for providing mist to a surrounding environment, the device comprising a housing unit having an inlet opening, an outlet opening, and a chamber extending between the inlet opening and the outlet opening along a central axis; a nozzle unit comprising at least one orifice; wherein the nozzle unit is arranged in the chamber, the nozzle unit being slidable along the central axis between a closing position, in which the nozzle unit closes the outlet opening, and an opening position, in which the at least one orifice connects the chamber to the surrounding environment in fluid communication; wherein the nozzle unit transfers from the closing position to the opening position if a fluid pressure at the inlet opening exceeds a predefined threshold; wherein the nozzle unit comprises a deflector part fixedly connected to the at least one orifice, the deflector part configured to deflect fluid in the opening position and to close the outlet opening in the closing position, wherein the at least one orifice is arranged offset to the central axis between the inlet opening and the deflector part; wherein the at least one orifice is configured to guide fluid flowing through the at least one orifice to directly impinge upon the deflector part, wherein the at least one orifice is directly oriented towards the deflector part.

2. The device according to claim 1, wherein the device further comprises a seal; wherein, in the closing position, the seal is arranged between the deflector part and the outlet opening and extending around the outlet opening.

3. The device according to claim 2, wherein, the seal is immovably arranged at the outlet opening.

4. The device according to claim 2, wherein in the closing position, the seal is frictionally engaged with the nozzle unit with a friction force that determines the predefined threshold.

5. The device according to claim 1, wherein the device further comprises a reset unit for driving the nozzle unit to the closing position.

6. The device according to claim 5, wherein the nozzle unit comprises a flange element for supporting the reset unit, the flange element extending around the central axis; wherein the reset unit is a spring that is arranged between the flange element and the outlet opening.

7. The device according to claim 1, wherein the nozzle unit further comprises a support element connecting the deflector part to the nozzle unit and extending along the central axis.

8. The device according to claim 1, wherein the housing unit comprises a stop flange at the outlet opening, wherein the nozzle unit comprises a stop shoulder, wherein, in the closing position the stop shoulder is arranged away from the stop flange, and wherein, in the opening position, the stop shoulder contacts the stop flange stopping a movement of the nozzle unit towards the outlet opening.

9. The device according to claim 1, wherein the deflector part comprises a surface element for diffusing fluid coming from the at least one orifice, the surface element facing the at least one orifice.

10. The device according to claim 9, wherein the surface element is angled with respect to a plane, which is orthogonal to the central axis, wherein the surface element particularly leads the fluid away from the central axis.

11. The device according to claim 1, wherein the housing unit comprises an exterior surface element at the outlet opening for collecting the deflected fluid coming from the deflector part, wherein the exterior surface element is angled with respect to a plane, which is orthogonal to the central axis, concentrating the fluid into a fluid area, which extends away from the housing unit along the central axis.

12. The device according to claim 11, wherein the exterior surface element is arranged on a housing end part, which is detachable from the housing unit.

13. The device according to claim 1, wherein the at least one orifice and the deflector part are formed in a single material block providing the nozzle unit.

14. The device according to claim 1, wherein the housing unit comprises a collar element extending around the outlet opening and away from the central axis.

15. A system for providing fluid to a surrounding environment, the system comprising at least two fluid supply connectors and at least two devices according to claim 1, wherein the at least two devices are connected to the at least two fluid supply connectors.

16. The device according to claim 2, wherein the device further comprises a reset unit for driving the nozzle unit to the closing position.

17. The device according to claim 3, wherein the device further comprises a reset unit for driving the nozzle unit to the closing position.

18. The device according to claim 4, wherein the device further comprises a reset unit for driving the nozzle unit to the closing position.

19. The device according to claim 2, wherein the nozzle unit further comprises a support element connecting the deflector part to the nozzle unit and extending along the central axis.

20. The device according to claim 3, wherein the nozzle unit further comprises a support element connecting the deflector part to the nozzle unit and extending along the central axis.

* * * * *